2,975,484
PROCESS FOR PRODUCING FILMS
Leonard Edward Amborski, Buffalo, N.Y., assignor to E. I. du Pont de Nemours and Company, Wilmington, Del., a corporation of Delaware
No Drawing. Filed Sept. 2, 1959, Ser. No. 837,601
5 Claims. (Cl. 18—48)

This invention relates to polymeric linear terephthalate ester films and more particularly to a process for producing the same. Still more particularly, it relates to such films which have enhanced physical properties.

This application is a continuation-in-part of my copending application Serial No. 629,456, filed December 20, 1956.

It is known to provide films of outstanding physical properties by stretching or orienting films of substantially amorphous polymeric linear terephthalate esters. These films generally have balanced properties, i.e., the physical properties are substantially the same in both the longitudinal and transverse directions of the films. For some uses of these films, e.g., magnetic recording tapes, metallic yarn, miscellaneous tapes, etc., wherein the films are in the form of tapes or ribbons, such films have certain undesirable characteristics including insufficiently high tensile strength and modulus (measure of stiffness) and too high a residual elongation, particularly in the longer or longitudinal direction of the tapes, and inadequate tear strength or tear resistance, particularly in the shorter or transverse direction of the tapes.

An object of this invention therefore is to provide a polymeric linear terephthalate ester film having outstanding directional physical properties. Another object is to provide such a film in the form of a tape having improved tensile strength, modulus and dimensional characteristics, e.g., resistance to deformation under tension and improved elongation in the longitudinal direction and greatly improved tear resistance in both the longitudinal and the cross or transverse direction. A further object is to provide such an improved tape useful as a base support in magnetic recording films. A still further object is to provide a novel process for producing such an improved film. Yet another object is to provide such a process which can be performed on conventional equipment.

The objects of this invention are accomplished by stretching a substantially amorphous polymeric linear terephthalate ester film from 1.5 × to 3.0 × in one direction and from 3.7 × to 5.0 × in the transverse direction at a temperature of between about 80° and 120° C. and heat setting the stretched film at a temperature between about 150° C. and 200° C. under tension. The resulting film has a tensile strength of at least 30,000 p.s.i. in the direction of the greater amount of stretch and a modulus of at least 700,000 p.s.i. and an elongation no greater than 50% in the same direction. By practicing the process of this invention, films are obtained having a unidirectional tensile strength as high as 60,000 p.s.i. and in the same direction a modulus of up to 1,300,000 p.s.i.

In a preferred embodiment, a substantially amorphous polymeric linear terephthalate ester film is stretched about 4.0 × in one direction at a temperature of 80° to 100° C., then stretched about 1.6 × in the transverse direction at a temperature of 80° to 100° C. while under tension in the direction of the first stretching sufficient to prevent shrinkage, and heat set at a temperature between about 180° and 200° C. while under tension sufficient to prevent shrinkage.

The preferred material which is utilized in the process of this invention and from which the films of this invention are made is polyethylene terephthalate as disclosed in Whinfield & Dickson U.S. Patent No. 2,465,319. The polyethylene terephthalate may be prepared by the condensation of ethylene glycol and terephthalic acid or preferably by an esterification reaction between ethylene glycol and an ester forming derivative of terephthalic acid or an ester thereof such as a dialkyl terephthalate, e.g., dimethyl terephthalate, and polymerizing the monomeric reaction product. Films of such substantially amorphous polymeric materials may be prepared by extruding the molten polymer through a narrow orifice.

It is to be understood, however, that the present invention comprehends films of any synthetic linear terephthalate ester polymer derived by reacting a glycol selected from the group having the formula $HO(CH_2)_nOH$ where $n$ is an integer from 2 to 10 inclusive, terephthalic acid or an ester forming derivative thereof or a low molecular weight alkyl ester thereof, and from 0 to 20% by weight of a second acid or ester thereof, said second acid being selected from the group which includes isophthalic acid, bibenzoic acid, sebacic acid, hexahydroterephthalic acid, adipic acid, azaleic acid, naphthalic acid, 2,5-dimethyl terephthalic acid and bis-p-carboxy phenoxy ethane.

The process of this invention may be carried out by stretching the amorphous film simultaneously within the specified limits, or by stretching the film first in either direction followed by stretching in the other direction. In an alternate process for effecting the directional stretching of the amorphous film, the film may first be stretched in one direction to a greater degree than is ultimately desired and subsequently stretched in the opposite direction (the transverse direction) the desired amount while permitting the film to neck in or draw down in the direction of the first stretch, thereby obtaining a film having orientation within the specified limits.

The minimum amount of stretch performed on the amorphous film in each direction is critical to the success of the present invention. Thus, the film must be stretched 1.5 × to 3.0 × in one direction and 3.7 × to 5.0 × in the transverse direction. The respective minima, 1.5 × and 3.7 ×, are necessary to provide the surprising property improvement in both directions of the film. Surprisingly, the stretch of greater degree, i.e., 3.7 × to 5.0 ×, besides improving film properties as discussed above, has an unexpected effect on the usefulness of the resulting terephthalate ester film. Such films when stretched in both directions with a stretch of greater degree in one direction but less than the required minimum of 3.7 × in this direction, i.e., about 3.0 ×, display non-uniformities across its width. The resulting film has a hazy, thicker middle section, representing about 50% of its width. This is believed due to poor orientation created by the presence of microscopic voids. The poor flexibility and, in general, poor properties of this hazy section makes such film practically useless as a tape, particularly as part of a magnetic tape. By stretching at least 3.7 × in the direction of greater stretch, on the other hand, transparency, clarity and flexibility are obtained across the entire width of the film.

The temperature at which stretching takes place is critical between 80° and 120° C. Stretching below the former results in a hazy film due to lack of film orientation created by the introduction of microscopic voids in the film. Stretching above the latter results in a substantial reduction in orientation.

An important feature of this invention is the surprising two-directional marked improvement in tear strength or tear resistance obtained by the stretching process of this invention when compared with film which has been substantially uniformly oriented by stretching, e.g., about 3.0 × in each direction. The unbalanced stretching process of this invention unexpectedly results in a film having a tear strength in both directions on the order of two to five times better than that of substantially uniformly oriented film. Film made by the preferred embodiment of the process of this invention has substantially uniform tear strength in both directions on the order of three to five times the tear strength of a substantially uniformly oriented film.

As used herein, tensile strength is intended to mean the amount of pull (amount of load) or directional force, conveniently expressed in pounds per square inch (p.s.i.), which is required to break the film at room temperature. Modulus, also expressed in p.s.i., and determined as described hereinafter, is a measure of bend (elasticity) and stiffness. Elongation is the extent to which a film will stretch in a given direction before breaking upon being subjected to tension in that direction at room temperature at a constant rate of 100% per minute.

The above mentioned improvements are attained without causing the film to fibrillate, i.e., without causing the occurrence of intolerable small lengthwise splits in the film, an achievement not possible when amorphous terephthalate ester films are unidirectionally stretched about 4.0 × to 5.0 ×.

The invention will be further illustrated but is not intended to be limited by the following examples:

EXAMPLE I

Substantially amorphous polyethylene terephthalate was extruded through an orifice in the form of a film. The film was then stretched in apparatus comprising a nip roll web stretcher having two sets of differentially driven pull rolls. The first set of rolls included a radiantly heated top roll covered with silicone rubber and an inductively heated metal coated bottom roll. The second set of rolls included a neoprene covered top roll and a metal plated bottom roll. The film was first stretched in the longitudinal direction (machine direction) an amount of 4.0 × its original length by varying the differential speeds of the two sets of rolls such that the peripheral speed of the second set was 4 times greater than that of the first set. Stretching temperatures were maintained between 80° and 95° C. The film was then stretched in a transverse direction (the direction perpendicular to the first direction of stretch) on a tenter frame to a width 1.6 × the unstretched width of the film. The transverse stretching temperature was also 80° to 95° C. The film was then heat set at between 180° and 200° C. under tension sufficient to prevent any film shrinkage.

A polyethylene terephthalate film which had been oriented substantially uniformly by stretching approximately 3 × in both directions as described in Scarlett U.S. Patent No. 2,823,421 as a control sample and the film of this example were tested. The tensile strength of the control sample of film was only 22,000 p.s.i. in each direction whereas the longitudinal tensile strength of the film of this example was measured to be 45,600 p.s.i. The modulus of the control sample was only 650,000 p.s.i. in both directions, whereas that of the film of this example was measured to be 1,210,000 p.s.i. in the longitudinal direction. Residual elongation of the control sample was 75% in both directions whereas the longitudinal residual elongation of this example was only 26%. Surprisingly the transverse direction residual elongation was also markedly less than that of the control sample measuring only 41%.

The tear strength of the polyester film produced according to this example evidenced a 5 fold superiority in the transverse direction and a 4 fold superiority in the longitudinal direction when compared with the uniformly oriented film sample. Thus, the control sample exhibited a tear strength of 20 grams per mil in both directions, whereas the film of this example had a tear strength in the transverse direction of 100 grams per mil and in the longitudinal direction of 88 grams per mil.

EXAMPLE II

Utilizing the stretching apparatus described in Example I, substantially amorphous polyethylene terephthalate film was stretched in both directions simultaneously to an extent of 1.6 × in the transverse direction and 4.0 × in the longitudinal direction at a temperature between 80° and 95° C. The film was heat set as in Example I and observed to have properties similar to the film of Example I.

In the above examples, tensile strength was measured on an Instron tensile testing machine (Model TT-B, Instron Engineering Co., Quincy, Massachusetts). This machine produces a load-elongation chart from which may be calculated the tensile strength (tensile breaking strength), the modulus (elastic modulus or stiffness) and elongation (residual or machine elongation). The tensile strength and modulus are expressed in terms of force per area based on the cross sectional area of the stretched film.

EXAMPLE III

Polyethylene terephthalate was extruded in the form of a film at a temperature of about 280° C. onto a quench drum where it was chilled to a temperature of about 75° C. The resulting substantially amorphous polyethylene terephthalate film was then conducted into a stretching apparatus as described in U.S. Patent No. 2,823,421 and very similar to that described in Example I.

The film was stretched 1.8 × in the longitudinal direction (machine direction) while maintained at a temperature between 80° C. and 90° C. The film was then subjected to additional heat which brought its temperature between 90° C. and 95° C. Thereafter, the film was stretched 3.7 × in the transverse direction. Finally, the biaxially stretched film was heat set at a temperature of about 150° C. while held under tension. The resulting film was clear, transparent, flexible and of uniform gauge or thickness across its width, ideally suited for commercial purposes particularly as a packaging material and as a magnetic tape base.

As a control, the above procedure was repeated except that the film was stretched 3.0 × in the transverse direction instead of 3.7 ×. The resulting film was only clear and transparent near its edges. The middle portion, representing about 50% of its width, was hazy (cloudy) and substantially brittle (poor flexibility). The thickness of the film varied about 100% across its width. Its tear strength in each direction was reduced to about ⅓ the tear strength of the film of this example.

The properties of both films are compared in the table below:

*Table*

| | Stretch (MD×TD) | Thickness (inches) | | Tear Strength (grams/mil) | | Tensile Strength (p.s.i.) | | Tensile Modulus (p.s.i.) | | Elongation (percent) | |
|---|---|---|---|---|---|---|---|---|---|---|---|
| | | Smallest | Largest | MD | TD | MD | TD | MD | TD | MD | TD |
| Example III | 1.8×3.7 | .0008 | .0009 | 67 | 22 | 11,000 | 29,300 | 433,300 | 800,000 | 80 | 60 |
| Control | 1.8×3.0 | .0009 | .0018 | 18 | 8 | 12,300 | 14,000 | 398,500 | 616,600 | 15 | 59 |

The tear strength (tear resistance) in the force required to tear the film in either direction as measured in grams per mil of film thickness. In the above examples, tear strength was measured on an Elmendorf Tear Tester (Albert Instrument Corp., Philadelphia, Pennsylvania). This device has a stationary jaw, a movable jaw mounted on a pendulum which swings on a frictionless bearing, and a means for measuring the maximum arc through which the pendulum swings. The film to be tested is placed between the jaws and the pendulum is released. The point at which the pendulum stops after tearing the film is recorded and the tear strength calculated therefrom.

The process of this invention is useful in preparing a film of superior properties. The film is highly useful for such applications as a base support in magnetic recording films and tapes, as a dielectric in a wide variety of electrical applications, e.g., insulation in motors, transformers, wires, cables, capacitors, etc., as a plastic glazing material, as a construction material for transparent containers, piping and bottle closures, as a packing material, in metallic yarn, miscellaneous (laminated) tapes, measuring tapes and scales, etc.

An advantage of the process of this invention is that it produces a film having outstanding physical properties. Another advantage is that the process can be continuously and controllably performed on conventional stretching equipment, of the types disclosed in Alles and Heilman U.S. Patent No. 2,728,941, Miller U.S. Patent No. 2,755,533 and the aforementioned Scarlett patent. An outstanding advantage of the film produced according to this invention is that it possesses tear strength in all directions superior to prior art films. Still another advantage of the film is that it is ideally suited for uses, e.g., magnetic tape, where unidirectional properties are desired. Still other advantages will be apparent from the above description of the invention.

The invention claimed is:

1. The process of producing a polymeric linear terephthalate ester film having outstanding physical properties which comprises stretching a substantially amorphous polymeric linear terephthalate ester film from 3.7 × to 5.0 × its original length in the longitudinal direction and from 1.5 × to 3.0 × its original width in the direction transverse to the longitudinal direction at a temperature between 80° and 120° C., the stretch in the second of the two directions being performed while restraining the film from shrinkage in the first of the two directions, and heat setting the stretched film at a temperature between about 150° and 200° C. under tension.

2. The process as set forth in claim 1 wherein said terephthalate ester is polyethylene terephthalate.

3. The process of producing a polymeric linear terephthalate ester film having outstanding physical properties which comprises stretching a substantially amorphous polymeric linear terephthalate ester film first from 3.7 × to 5.0 × its original length in the longitudinal direction and then from 1.5 × to 3.0 × its original width in the direction transverse to the longitudinal direction at a temperature between 80° and 120° C. while restraining the film from shrinkage in the longitudinal direction and heat setting the stretched film at a temperature between about 150° and 200° C. under tension sufficient to prevent shrinkage.

4. The process of producing a polymeric linear terephthalate ester film having outstanding physical properties which comprises stretching a substantially amorphous polymeric linear terephthalate ester film first from 1.5 × to 3.0 × its original width in a direction transverse to the longitudinal direction and then from 3.7 × to 5.0 × its original length in the longitudinal direction at a temperature between 80° and 120° C. while restraining the film from shrinkage in the direction transverse to the longitudinal direction and heat setting the stretched film at a temperature between about 150° and 200° C. under tension sufficient to prevent shrinkage.

5. The process of producing a polymeric linear terephthalate ester film having outstanding physical properties which comprises stretching a substantially amorphous polymeric linear terephthalate ester film first about 4.0 × its original length in the longitudinal direction and then about 1.6 × its original width in the direction transverse to the longitudinal direction at a temperature between 80° and 100° C. while restraining the film from shrinkage in the longitudinal direction and heat setting the stretched film at a temperature between 180° and 200° C. under tension sufficient to prevent shrinkage.

References Cited in the file of this patent

UNITED STATES PATENTS

| | | |
|---|---|---|
| 2,627,088 | Alles et al. | Feb. 3, 1953 |
| 2,823,421 | Scarlett | Feb. 18, 1958 |